United States Patent
Chua et al.

(10) Patent No.: US 7,394,058 B2
(45) Date of Patent: Jul. 1, 2008

(54) TOUCH SCREEN WITH LIGHT-ENHANCING LAYER

(75) Inventors: Janet Bee Yin Chua, Perak (MY); Kamala Manickavasagam Ravindaran, Penang (MY); Yue Hoong Lau, Penang (MY)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/484,908

(22) Filed: Jul. 12, 2006

(65) Prior Publication Data

US 2008/0011944 A1 Jan. 17, 2008

(51) Int. Cl.
*G06F 3/041* (2006.01)

(52) U.S. Cl. ............... 250/221; 250/222.1; 250/227.14; 385/12; 385/13; 345/173; 345/175; 345/176

(58) Field of Classification Search ................. 250/221, 250/222.1, 227.11, 227.14; 385/12, 13; 345/173, 345/175, 176; 178/18.09, 18.11; 362/610, 362/615, 623
See application file for complete search history.

(56) References Cited

U.S. PATENT DOCUMENTS

| | | | | |
|---|---|---|---|---|
| 4,346,376 A | * | 8/1982 | Mallos | 345/176 |
| 4,484,179 A | * | 11/1984 | Kasday | 345/176 |
| 4,542,375 A | * | 9/1985 | Alles et al. | 345/176 |
| 7,351,949 B2 | * | 4/2008 | Oon et al. | 250/221 |
| 2004/0108990 A1 | | 6/2004 | Lieberman et al. | |
| 2006/0027120 A1 | * | 2/2006 | Smith | 102/202.12 |
| 2006/0066586 A1 | * | 3/2006 | Gally et al. | 345/173 |
| 2006/0279558 A1 | * | 12/2006 | Van Delden et al. | 345/176 |
| 2006/0290684 A1 | * | 12/2006 | Giraldo et al. | 345/175 |
| 2007/0084989 A1 | * | 4/2007 | Lange et al. | 250/221 |
| 2007/0125937 A1 | * | 6/2007 | Eliasson et al. | 250/221 |

FOREIGN PATENT DOCUMENTS

WO  WO 2005/029394 A2  3/2005

* cited by examiner

*Primary Examiner*—Davienne Monbleau
(74) *Attorney, Agent, or Firm*—Marc Bobys

(57) ABSTRACT

A touch indication device comprises a light guide structure for passing light of a light source via total internal reflection. A touch surface disturbs the total internal reflection when touched, causing light to leave the light guide structure. A light enhancement layer converts the light leaving the light guide and sends the converted light to a light detector. The light enhancement layer amplifies the intensity and/or changes the color of the light leaving the light guide. The detector determines the position of the touch on the touch surface based on the light from the light enhancement layer.

14 Claims, 3 Drawing Sheets

TOUCH SCREEN WITH LIGHT-ENHANCING LAYER

FIELD OF THE INVENTION

The invention relates to the field of data input methods and apparatus generally.

BACKGROUND OF THE INVENTION

Input devices based on touch screens provide a convenient method for inputting commands in a manner that is easily reconfigured. In such devices, a simulated button pattern is displayed on the screen and the user selects a "button" by touching the screen over the button image.

One particular type of touch screen makes use of frustrated total internal reflection in a light guide to detect when the screen has been touched. This type of touch screen is constructed from a touch panel, an image generator and an imaging system. The image generator creates an image of simulated buttons or other objects to touch. This image is visible through the touch panel. The touch panel includes an optically transparent layer, or light guide, having an index of refraction greater than that of the surrounding air. A light source generates a light signal that is reflected between first and second sides of the optically transparent layer. The imaging system records an image of a second side of the touch screen. When a user touches a first side of the touch screen, a portion of the total-internal reflected light is reflected towards the second side of the touch panel at an angle less than the critical angle and escapes from the second side of the touch panel. This creates a bright spot on the surface of the second side of the touch panel and the location of this bright spot is recorded by the imaging system. A simulated button push is generated based on the location of the detected bright spot.

One example of this type of touch screen is described in the International Application Published Under The Patent Cooperation Treaty (PCT) by the applicant "Konin-Klijke Philips Electronics N.V.", having International Publication Number WO 2005/029394 A2 and published on 31 Mar. 2005 (hereinafter referred to as "Philips") and entitled "Light Guide Touch Screen". As illustrated in FIG. 1, Philips includes a light guide 102 arranged adjacent to a screen 101. The light guide 102 has a light source 108 arranged to emit light 110 into the light guide 102. The optical matching between the light guide 102 and its surroundings is adapted such that the light 110 of the light source 108 is normally confined within the light guide 102 by means of total internal reflection. However, a user establishing physical contact with the light guide 102 perturbs the state of total internal reflection, and some of the light 110 is extracted from the light guide 102. In the display device, light detecting means 103 is arranged to detect the light 110 and relate this detection to an input position where the user contact occurred.

Another example of this type of touch screen is described in U.S. Patent Application Publication US 2004/0108990 A1 to Lieberman et al. (hereinafter referred to as "Lieberman") which shows a similar touch screen making use of frustrated total internal reflection to determine an input position where user contact to the screen occurred. As illustrated in FIG. 2, Lieberman employs a transparent data entry-object engagement surface 290, exhibiting total internal reflection. A planar beam of light, designated by reference numeral 299, is emitted by an illuminator 294 and coupled to an edge 295 of the surface 290 through which a beam 292 passes by total internal reflection. The presence of an object, such as a data entry object 296 in contact with the surface 290, causes light from the beam 292 to be scattered into a scattered beam 297 due to frustrated total internal reflection and inter alia to pass through the transparent data entry object engagement surface 290 so as to be detected by a camera 298.

A problem with these "frustrated total internal reflection" based touch screens is that it can be difficult to detect a "bright spot" over the noise created by the ambient light. In a bright environment, ambient light can pass through the touch screen to the light detector causing "noise" which makes the "bright spot" seem relatively dim.

As mentioned above, these touch screens are often used with an image generator which creates an image of simulated buttons or other objects to touch. The image generator often requires lighting and this lighting can also cause "noise", making it more difficult to detect the "bright spot".

One solution to these problems is to use a brighter light source for the light guide, however, this requires greater electrical power which is undesirable for portable devices.

It would be desirable to provide a "frustrated total internal reflection" based touch indication screen that uses less electrical power and works well even in bright ambient light environments.

SUMMARY OF THE INVENTION

These and other objects are provided by the present invention which provides a "frustrated total internal reflection" based touch indication device. The present invention incorporates a light-enhancing layer to provide a "frustrated total internal reflection" based touch indication device that can use less power and can work well even in bright ambient light environments.

In general terms, one embodiment of the invention is a touch indication device, or more specifically a touch screen data input device, comprising a light guide structure for passing light of a light source via total internal reflection. A touch surface, which disturbs the total internal reflection when touched, causes light to leave the light guide structure. A light enhancement layer converts the light leaving the light guide and sends the converted light to a light detector. The light enhancement layer amplifies the intensity and/or changes the color of the light leaving the light guide. The light enhancement layer can be comprised of phosphor. The thickness and/or composition of the phosphor layer can vary with position to output phosphor-converted light having position information. A CPU receives data from the detector and controls the display screen. The CPU also generates and modifies simulated buttons and other objects as touch targets displayed on a display screen. The detector determines the position of the touch on the touch surface based on the light from the light enhancement layer.

The light guide can be made from ITO glass in which case the touch surface of the light guide disturbs the total internal reflection when touched by a touch object which displaces the ambient air adjacent to the touch surface thereby reducing the difference in indices of refraction at the touch surface interface and disturbing the total internal reflection.

The light guide can also be made of a deformable plastic in which case the touch surface of the light guide deforms the light guide inwardly when touched, causing an indentation in the light guide so that the light scatters from the indentation, thereby disturbing the total internal reflection.

BRIEF DESCRIPTION OF THE DRAWINGS

Further preferred features of the invention will now be described for the sake of example only with reference to the following figures, in which.

DETAILED DESCRIPTION

Figure 1:
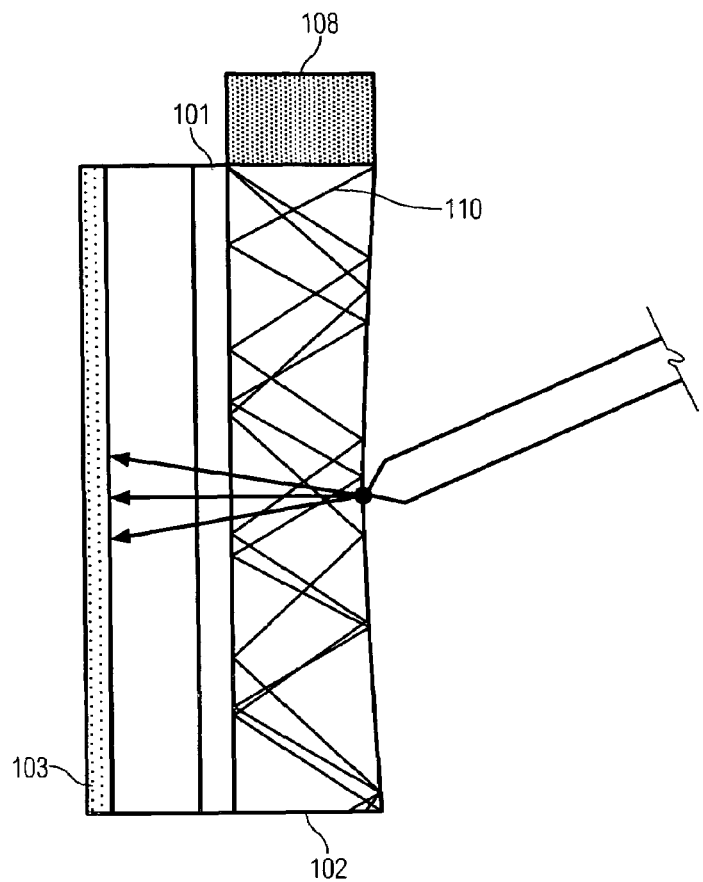
FIG. 1 illustrates a light guide touch screen making use of the frustrated total internal reflection of the prior art.
Figure 2:
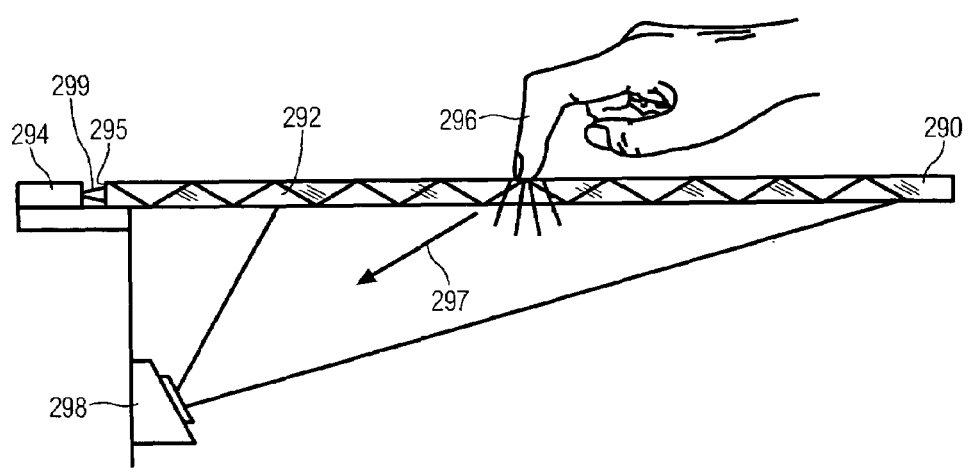
FIG. 2 illustrates another light guide touch screen making use of the frustrated total internal reflection of the prior art.
Figure 3:
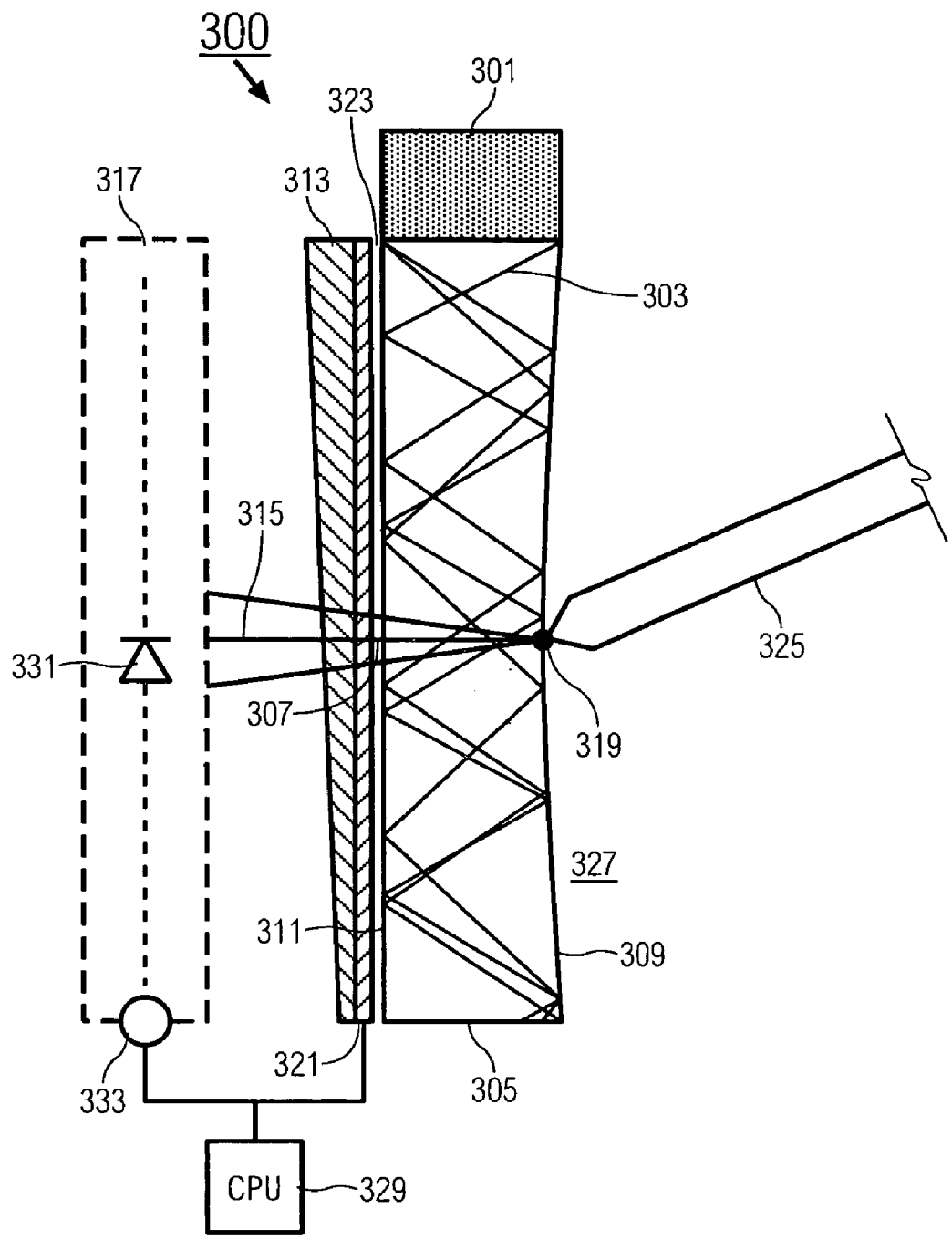
FIG. 3 is a side view of a touch screen of the present invention making use of frustrated total internal reflection and utilizing a light enhancement layer.

FIG. 3 is a side view of a touch screen 300. More generally, the touch screen 300 is a touch indication device. A light source 301 emits light 303 into a light guide 305. The optical matching between the light guide 305 and its surroundings is adapted such that the light rays 303 of the light source 301 are normally confined within the light guide 305 by means of total internal reflection. However, when a user touches the touch surface 309 with a touch-object 325, which can be a stylus, finger, or other object, the state of the total internal reflection is perturbed, and perturbed light 307 is extracted from the light guide 305 through a light extraction surface 311 of the light guide 305.

A phosphor layer 313 is deposited on a display screen 321. The display screen 321 is shown between the phosphor layer 313 and the light guide 305. Alternatively the phosphor layer 313 can be between the display screen 321 and light guide 305. The phosphor layer 313 enhances the efficiency of the perturbed light 307 and outputs phosphor-converted light 315.

Directly adjacent to the light extraction surface 311 can be a layer of ambient air 323 to provide a favorable critical angle for the total internal reflection of the light rays 303.

A light detection means 317 is arranged to detect the phosphor-converted light 315 and relate this detection to an input position 319 where the user contact occurred. The light detection means 317 can include one or more light detectors 331, such as photodetectors.

The display screen 321 can be a mask with images of simulated buttons or other objects to touch and also possibly other labels printed thereon. Alternatively, the display screen 321 can be a LCD or other programmable display which is controlled by the CPU 329 so that the simulated buttons or other objects to touch and other labels can change during operation. The display screen 321 can be illuminated by its own light source to increase the visibility of the touch objects or labels. This light source can be in front of or in back of the display screen 321. The display screen 321 is transparent to the perturbed light 307 so that the perturbed light 307 can reach the light detection means 317. The display screen 321 is also made transparent to the phosphor-converted light 315 when the display screen 321 is positioned between the phosphor layer 313 and the light detection means 317.

In other embodiments the display screen 321 is adjacent the touch surface 309 and in these embodiments the display screen 321 need not be transparent to the perturbed light 307 or the phosphor-converted light 315.

The principal behind the disturbed total internal reflection of the present invention is now considered in more detail, again with reference to FIG. 3. The light source 301 shines the light rays 303 into the light guide 305 through an edge of the light guide 305. The plurality of light rays 303 that strike the touch surface 309 and the light extraction surface 311 at angles to the surface normal greater than the critical angle are totally internally reflected from the touch surface 309 and the light extraction surface 311.

The critical angle is measured from a normal to the surface and is determined by Snell's Law, which determines the refraction of light at a boundary between two media through which light passes:

A sin X=B sin Y; where A=index of refraction of the first material through which light passes (in this case, the material of the light guide 305), B=index of refraction of the second material through which light passes (in this case, the layer of ambient air 327 adjacent to the touch surface 309), Y=angle between a normal to the touch surface 309 and a light ray 303 after refracting through touch surface 309, and X=angle between a normal to the touch surface 309 and a light ray 303 before refracting at the touch surface. The critical angle for total internal reflection is the value of X where Y=90 degrees. If A=1.5 (the approximate index of refraction for glass) and B=1.0 (the approximate index of refraction for air), then the critical angle is approximately 41.8 degrees. The same analysis applies at the light extraction surface 311.

When the touch-object 325 displaces the ambient air adjacent to the touch surface 309, total internal reflection is interrupted. This phenomenon occurs because air has an index of refraction significantly lower than that of the material of the light guide 305 or that for the touch-object 325. Where there is not a significant difference in indices of refraction at the two sides of the touch surface 309, total internal reflection does not occur at that point. The layer of air adjacent to the touch surface 309 necessary for total internal reflection is very thin. Thus, paper- or cloth-covered objects (and, in some cases, fingers with very dry skin) might not effectively displace the layer, whereas most fingers or rubbery objects likely would displace the layer and thus interrupt total internal reflection. Some of the light rays 303 that experience the disruption of total internal reflection are scattered or reflected back through the light extraction surface 311, whereupon they refract at various angles as perturbed light 307. The perturbed light 307 passes through the ambient air 323 and to the phosphor layer 313.

The light guide 305 can be made from a rigid material such as ITO (Indium Tin Oxide) glass.

Rather than using ITO glass, the light guide 305 can be molded from an elastomeric material such as an untinted, diffused, optical grade silicone rubber, such as 150-OU which can be supplied by Tory Rubber Company, a division of Dow Corning. Also, Kurabe Industrial Co. Ltd produces bendable Elastomer light strips.

A combination of a rigid material such as ITO glass and a flexible material such as silicone rubber can be used to form the light guide 305.

When a deformable light guide 305 is used, a different mechanism can be used for disturbing total internal reflection. The touch-object 325 can deform the light guide 305 inwardly, causing an indentation in the light guide 305 so that the light 303 scatters from the indentation. This results in positional dependent converted light 315 which can be used to determine the input position 319 where the user contact occurred as described with reference to FIG. 3 above.

In one embodiment the phosphor layer 313 is made from yellow phosphor. The light source 301 can be a blue LED generating blue light as the light rays 303. The yellow phosphor enhances the efficiency of the blue perturbed light 307 passing through it. The yellow phosphor layer 313 partially converts the blue perturbed light 307 to converted yellow light. The converted yellow light mixes with the unconverted blue light to produce white light. This conversion increases the brightness of the perturbed light 307 in the range of approximately 2.5 to 6 times. The exact brightness increase depends on the phosphor efficiency and thickness of the phosphor layer. Also, different thickness of the phosphor layer 313 will produce different colors.

In another embodiment, the light 303 which the light source 301 emits into the light guide 305 can be UV light and the phosphor layer 313 converts the UV light to white light. In this embodiment a UV inhibitor layer should be placed between the touch surface 309 and the observer to prevent UV light from harming the observer's eyes.

Rather than using the phosphor layer 313, other methods can be used to amplify the light. For example, amplifiers can be used or other materials can be used.

"OLEDs" using Organic types of phosphor can also be used to enhance or amplify the light. Also, quantum dots phosphor can be used.

Various types or phosphor can be used depending on the color of the light that is desired for illumination or backlighting. Red phosphors such as CaS, SrS, CaSrS, ZnS, ZnSe, ZnSeS or green phosphors such as SrTg, BaGa2S4 can be used. Also, a mixture of these or other phosphors can be used to produce different color hues.

Therefore, the layer 313 can generally be described as a light enhancement layer.

Figure 4:
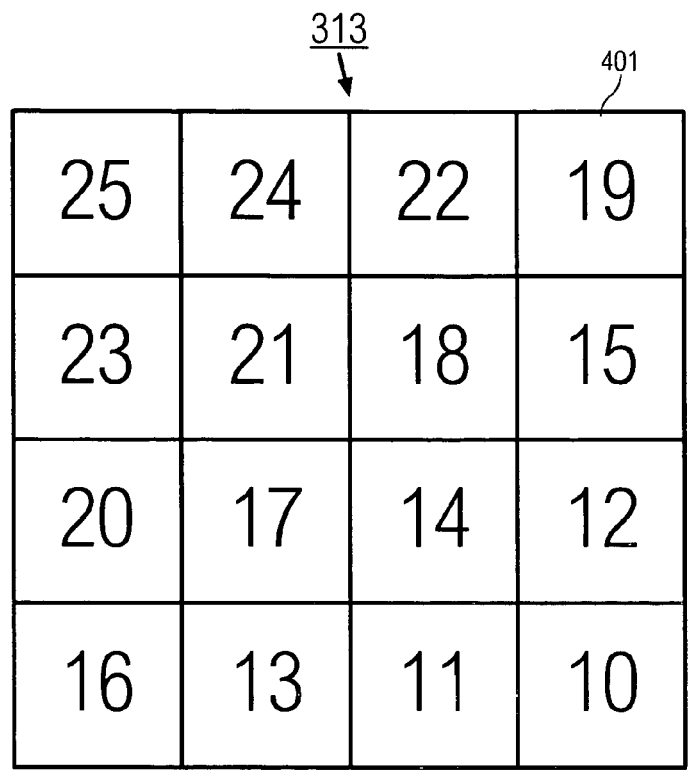
FIG. 4 is a diagrammatic top view of one embodiment of a phosphor layer having a spatial thickness variation used with the invention of FIG. 3.

FIG. 4 is a diagrammatic top view of one embodiment of the phosphor layer 313. In this embodiment the thickness of the phosphor layer 313 varies with position. The phosphor layer is shown divided into sixteen discrete sections 401, each section having a different thickness. In this example the thicknesses are shown to vary from 10 to 25 units, wherein the units are scalable to the desired dimensions depending on the particular touch screen 300 and type of phosphor used. Of course the number, area, and thickness of the sections can be varied as would be understood by one skilled in the art.

By varying the thickness of the phosphor layer 313 with position, the phosphor-converted light 315 will have a color and brightness that corresponds to one of the discrete sections 401 which in turn corresponds to a position where the touch-object 325 touches the touch surface 309. Thus the phosphor-converted light contains position information.

Figure 5:
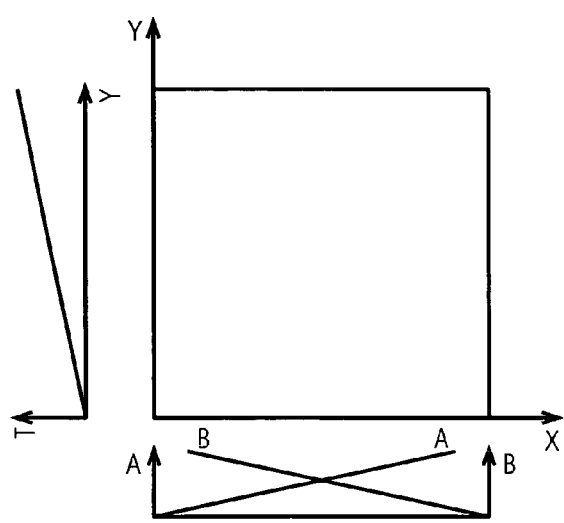
FIG. 5 is a diagrammatic top view of one embodiment of a phosphor layer having both a continuous spatial thickness variation and a spatial phosphor composition variation used with the invention of FIG. 3.

Rather than using the phosphor layer discrete spatial thickness variation of FIG. 4, a continuous spatial thickness variation can be used as illustrated in FIG. 5. In FIG. 5 the phosphor thickness ("T") of the phosphor layer 313 varies continuously with increasing "y". The phosphor layer 313 is made up of two different color producing components, illustrated as "A" and "B", and the relative ratio of these components vary inversely to each other with increasing "x". Thus, each position of the phosphor layer 313 has a unique color/intensity combination. From the unique color/intensity combination it can be determined at which position the touch-object 325 touched the touch surface 309.

In FIG. 3 the phosphor layer 313 is shown deposited on the display screen 321. The phosphor layer 313 can also be deposited on a separate plate rather than directly on the display screen 321. The phosphor layer 313 can even be deposited directly on the light extraction surface 311 of the light guide 305, so long as it has an index of refraction less than that of the light guide so as not to frustrate the total internal reflection of the light rays 303 in the light guide 305. In general, the phosphor layer 313 can be deposited in any way so long as it is between the light guide 305 and the light detecting means 317 and so as to achieve the objects of the invention.

Various processes can be used to deposit the phosphor.

Electrophoretic deposition processes can be used to deposit the phosphor layer 313 having the desired thickness within a desired precision. U.S. Pat. No. 6,576,488 to Collins et al. and U.S. Pat. No. 6,864,110 to Summers et al. both provide examples of electrophoretic deposition processes that can be adopted to achieve the desired thickness within a desired precision.

U.S. Pat. No. 6,869,753 to Chua et al. describes a screen printing process that can be used to deposit the phosphor layer 313 with less precision but also with less expense.

US Patent Publication US2004/0196318 by Su et al. describes another relatively inexpensive phosphor coating method using inkjet "printing" that can be adopted to deposit the phosphor layer 313. US Patent Publication US 2004/0166234 to Chua et al. also describes a method that that can be adopted to deposit the phosphor layer 313.

The light detection means 317 can include one or more conventional type of light detector 331. For example, the light detector 331 can be an image sensor array of a conventional digital camera. The image sensor array can be a complementary metal oxide semiconductor (CMOS) or charge coupled device (CCD), for example. The light detector 331 is made up of many photosites or pixels, each acquiring a portion of the image. The image can be that of the phosphor layer 313, or in general, the light coming from any applicable type of light enhancement layer. It can be pre-determined which part of the phosphor layer 313 each of the image sensor array pixels corresponds to and thus it can be determined which part of the light guide 305 touch surface 309 has been touched by the touch-object 325.

The light detection means 317 can also include an interface 333 for communicating with the CPU 329. The CPU 329 receives instructions based on which part of the light guide 305 touch surface 309 has been touched by the touch-object 325. The CPU 329 can also generate and modify the simulated buttons, other objects to touch and other labels displayed on the display screen 321 depending on where the touch surface 306 has been touched.

The variation of the thickness of the phosphor layer 313 with position and/or the variation of the ratios of different phosphor components with position results in position-dependent color and intensity output values of the phosphor-converted light 315. In other words, the phosphor-converted light 315 has position information. The light detection means 317 when in the form of a sensor array, can use this position information to better distinguish between adjacent input positions 319.

The light detection means 317 can also be a single sensor or photodetector. Since each input position 319 corresponds to the discrete sections 401 of FIG. 4 or continuous phosphor variations of FIG. 5, by measuring light intensity the single sensor can determine the input position 319.

The light detection means 317 can also be a color sensor. The continuous phosphor composition and thickness variations of FIG. 5, allow determination of the input position 319 based upon the measurement of light intensity and color by the color sensor. Also, measuring the of light intensity and color by the color sensor can allow for the determination of the input position 319 when the phosphor layer 313 has the discrete sections 401 of FIG. 4.

A light focusing or guiding means can be positioned between the phosphor layer 313 and the light detection means 317 to optimize the amount of light received by the light detector 331.

The present invention may be embodied in other forms without departing from its spirit and scope. The embodiments described above are therefore illustrative and not restrictive, since the scope of the invention is determined by the appended claims rather then by the foregoing description, and all changes that fall within the meaning and range of equivalency of the claims are to be embraced within their scope.

What is claimed is:

1. A touch indication device comprising:
a light guide structure for passing light of a light source via total internal reflection;
a touch surface which disturbs the total internal reflection when touched, causing light to leave the light guide structure; and
a light enhancement layer for converting the light leaving the light guide and sending the converted light to a light detector wherein the light enhancement layer is comprised of phosphor and converts the color of the light leaving the light guide.

2. The device of claim 1, wherein the light enhancement layer amplifies the intensity of the light leaving the light guide.

3. The device of claim 1, wherein the thickness of the phosphor layer varies with position to output phosphor-converted light having position information.

4. The device of claim 1, wherein the composition of the phosphor layer varies with position to output phosphor-converted light having position information.

5. The device of claim 1, wherein the light detector comprises a color sensor.

6. The device of claim 1, wherein the light detector comprises a sensor array.

7. The device of claim 1, further comprising a CPU for receiving data from the detector and for controlling a display screen.

8. The device of claim 7, wherein the CPU generates and modifies simulated buttons and other objects as touch targets displayed on the display screen.

9. The device of claim 1, wherein the touch surface disturbs the total internal reflection when touched by a touch object which displaces the ambient air adjacent to the touch surface thereby reducing the difference in indices of refraction at the touch surface interface and disturbing the total internal reflection.

10. The device of claim 1, wherein the touch surface deforms the light guide inwardly when touched, causing an indentation in the light guide so that the light scatters from the indentation, thereby disturbing the total internal reflection.

11. The device of claim 9, wherein the light guide is made from ITO glass.

12. The device of claim 10, wherein the light guide is made from a deformable plastic.

13. The device of claim 1, wherein the light enhancement layer increases the efficiency of the light leaving the light guide.

14. The device of claim 1, wherein the light enhancement layer is located between the light guide and the light detector.

* * * * *